United States Patent
Liu et al.

(10) Patent No.: US 10,628,371 B1
(45) Date of Patent: Apr. 21, 2020

(54) USB DETECTING METHOD AND USB EXPANSION DEVICE USING SAME

(71) Applicant: FLYTECH TECHNOLOGY CO., LTD, Taipei (TW)

(72) Inventors: Yun-Ping Liu, Taipei (TW); Hsiao-Hui Lee, Taipei (TW); Shuei-Jin Tsai, Taipei (TW)

(73) Assignee: FLYTECH TECHNOLOGY CO., LTD, Taipei (TW)

(*) Notice: Subject to any disclaimer, the term of this patent is extended or adjusted under 35 U.S.C. 154(b) by 0 days.

(21) Appl. No.: 16/183,791

(22) Filed: Nov. 8, 2018

(30) Foreign Application Priority Data

Oct. 5, 2018 (TW) .............................. 107135282 A (51) Int. Cl.
*G06F 13/42* (2006.01)
*G06F 13/40* (2006.01)

(52) U.S. Cl.
CPC ...... *G06F 13/4282* (2013.01); *G06F 13/4022* (2013.01); *G06F 2213/0042* (2013.01)

(58) Field of Classification Search
CPC .......................... G06F 13/4282; G06F 13/4022
See application file for complete search history.

(56) References Cited

U.S. PATENT DOCUMENTS

| | | | | |
|---|---|---|---|---|
| 5,884,086 A * | 3/1999 | Amoni | ..................... | G06F 1/266 700/282 |
| 6,735,720 B1 * | 5/2004 | Dunn | .................. | G06F 11/0745 714/43 |
| 7,260,749 B2 * | 8/2007 | Cox | ..................... | G06F 11/0745 710/100 |
| 7,320,077 B2 * | 1/2008 | Kim | .......................... | G06F 1/26 713/300 |
| 2005/0289257 A1 * | 12/2005 | Fink | .......................... | G06F 1/24 710/62 |
| 2006/0248257 A1 * | 11/2006 | Kojima | ................... | G06F 1/266 710/316 |
| 2007/0150758 A1 * | 6/2007 | Henderson | .......... | G06F 11/0766 713/300 |
| 2008/0235524 A1 * | 9/2008 | Sharma | .................. | G06F 1/266 713/300 |
| 2010/0031087 A1 * | 2/2010 | Lin | ....................... | G06F 11/073 714/15 |
| 2016/0062940 A1 * | 3/2016 | Cota-Robles | ....... | G06F 13/4221 710/313 |

\* cited by examiner

*Primary Examiner* — Tim T Vo
*Assistant Examiner* — Phong H Dang
(74) *Attorney, Agent, or Firm* — WPAT, PC (57) ABSTRACT

A USB detecting method for use with a controlling and processing unit, a USB input/output port, at least one switch and at least one USB peripheral device is provided. The at least one switch is arranged between the controlling and processing unit and the USB input/output port and/or arranged between the USB input/output port and the at least one USB peripheral device that is electrically connected with the USB input/output port. Firstly, a USB detection signal of the at least one USB peripheral device is provided to the controlling and processing unit. According to a result of receiving the USB detection signal, the controlling and processing unit determines whether the switch is reset. For resetting the at least one switch, the controlling and processing unit simulates the action of plugging and pulling out the USB peripheral device.

14 Claims, 5 Drawing Sheets

USB DETECTING METHOD AND USB EXPANSION DEVICE USING SAME

FIELD OF THE INVENTION

The present invention relates to a detecting method and an expansion device, and more particularly to a UBS detecting method and a USB expansion device with an automatic detecting function and an active correcting function.

BACKGROUND OF THE INVENTION

Recently, electronic devices with universal serial bus (USB) interfaces are widely used as the peripheral devices of computer systems. In addition, the types of the electronic devices with USB interfaces are more diverse. For example, the electronic devices include flash drives, keyboards, mouse devices, speakers, or the like.

However, in many situations, the electronic devices with USB interfaces still have some drawbacks. For example, since the types of the electronic devices with USB interfaces are diverse, the electronic devices are possibly incompatible with different operation systems or different software/hardware devices. In case that the incompatibility problems occur, the USB interfaces that are originally in the normal working state are suddenly in a disabled state. In the disabled state, the electronic device cannot be normally operated.

When the electronic device is in the disabled state, the user may plug and pull out the electronic device again or restart the operation system to read the electronic device again. In such way, the USB interface is restored to the normal working state. That is, the conventional electronic devices with the USB interfaces are not user-friendly.

Therefore, there is a need of providing an improved UBS detecting method and an improved USB expansion device in order to overcome the drawbacks of the conventional technologies.

SUMMARY OF THE INVENTION

For solving the drawbacks of the conventional technologies, the present invention provides a UBS detecting method and a USB expansion device with an automatic detecting function and an active correcting function.

In accordance with an aspect of the present invention, there is provided a USB detecting method for use with a controlling and processing unit, a USB input/output port, at least one switch and at least one USB peripheral device, which are electrically connected with each other. The at least one switch is arranged between the controlling and processing unit and the USB input/output port, and/or the at least one switch is arranged between the USB input/output port and the at least one USB peripheral device that is electrically connected with the USB input/output port. The USB detecting method includes the following steps. Firstly, a USB detection signal of the at least one USB peripheral device is provided to the controlling and processing unit. Then, the controlling and processing unit judges whether the at least one USB peripheral device is present or the USB input/output port are in a disabled state according to a result of receiving the USB detection signal. If the at least one USB peripheral device is not present or the USB input/output port are in the disabled state, the controlling and processing unit resets the at least one switch.

In an embodiment, after the controlling and processing unit actively performs a polling process or a daisy chain detecting process, the USB detection signal is acquired and provided to the controlling and processing unit.

In an embodiment, if the controlling and processing unit does not receive the USB detection signal within a specified time interval, the controlling and processing unit judges that the at least one USB peripheral device is not present or the USB input/output port are in the disabled state. The specified time interval is 0.01 second, 0.05 second, 0.1 second, 0.5 second, 1 second or 2 seconds.

In an embodiment, if the number of times the USB detection signal is not provided to the controlling and processing unit at a specified time interval reaches a specific number, the controlling and processing unit judges that the at least one USB peripheral device is not present or the USB input/output port are in the disabled state. The specified number is 1, 2, 3 or 5.

In an embodiment, if the controlling and processing unit recognizes that the number of the at least one USB peripheral device is increased or decreased according to the result of receiving the USB detection signal, the USB detecting method further comprises a step of updating the result of receiving the USB detection signal.

In an embodiment, the controlling and processing unit is one of a single chip and a microcontroller, and the at least one switch is triggered when a control pin of one of the single chip and a microcontroller is triggered.

In an embodiment, the at least one switch includes a data signal switch and a power signal switch. The controlling and processing unit resets at least one of the data signal switch and the power signal switch.

In an embodiment, the step of allowing the controlling and processing unit to reset the at least one switch includes steps of turning off the power signal switch, turning off the data signal switch, turning on the data signal switch again, and turning on the power signal switch again.

In an embodiment, the at least one switch includes a transistor switching circuit. After the at least switch is turned off in response to a control signal from the controlling and processing unit, the at least one switch is turned on again.

In accordance with another aspect of the present invention, there is provided a USB expansion device. The USB expansion device includes a controlling and processing unit, a USB hub and at least one switch. The USB hub provides a USB detection signal of at least one USB peripheral device to the controlling and processing unit. The at least one switch is arranged between the controlling and processing unit and the USB hub, and/or arranged between the USB hub and the at least one USB peripheral device that is electrically connected with the USB hub. The controlling and processing unit resets the at least one switch according to a result of receiving the USB detection signal.

In an embodiment, the controlling and processing unit is applied to a main system. The main system performs a polling process or a daisy chain detecting process to acquire the USB detection signal.

In an embodiment, the controlling and processing unit is electrically connected with a main system. After the controlling and processing unit performs a polling process or a daisy chain detecting process to acquire the USB detection signal, the USB detection signal is provided to the main system.

In an embodiment, if the controlling and processing unit does not receive the USB detection signal within a specified time interval, the controlling and processing unit judges that the at least one USB peripheral device is not present or the USB input/output port are in the disabled state. The specified time interval is 0.01 second, 0.05 second, 0.1 second, 0.5 second, 1 second or 2 seconds.

In an embodiment, if the number of times the USB detection signal is not provided to the controlling and processing unit within a specified time interval reaches a specific number, the controlling and processing unit judges that the at least one USB peripheral device is not present or the USB input/output port are in the disabled state. The specified number is 1, 2, 3 or 5.

In an embodiment, if the controlling and processing unit recognizes that the number of the at least one USB peripheral device is increased or decreased according to the result of receiving the USB detection signal, the USB detecting method further includes a step of updating the result of receiving the USB detection signal.

In an embodiment, the controlling and processing unit is one of a single chip and a microcontroller, and the at least one switch is triggered when a control pin of one of the single chip and a microcontroller is triggered.

In an embodiment, the at least one switch includes a data signal switch and a power signal switch.

In an embodiment, the controlling and processing unit resets at least one of the data signal switch and the power signal switch. While the controlling and processing unit resets the at least one switch, the controlling and processing unit sequentially turns off the power signal switch, turns off the data signal switch, turns on the data signal switch again and turns on the power signal switch again.

In an embodiment, the at least one switch includes a transistor switching circuit. After the at least switch is turned off in response to a control signal from the controlling and processing unit, the at least one switch is turned on again.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention will now be described more specifically with reference to the following embodiment and accompanying drawings.

Figure 1A:
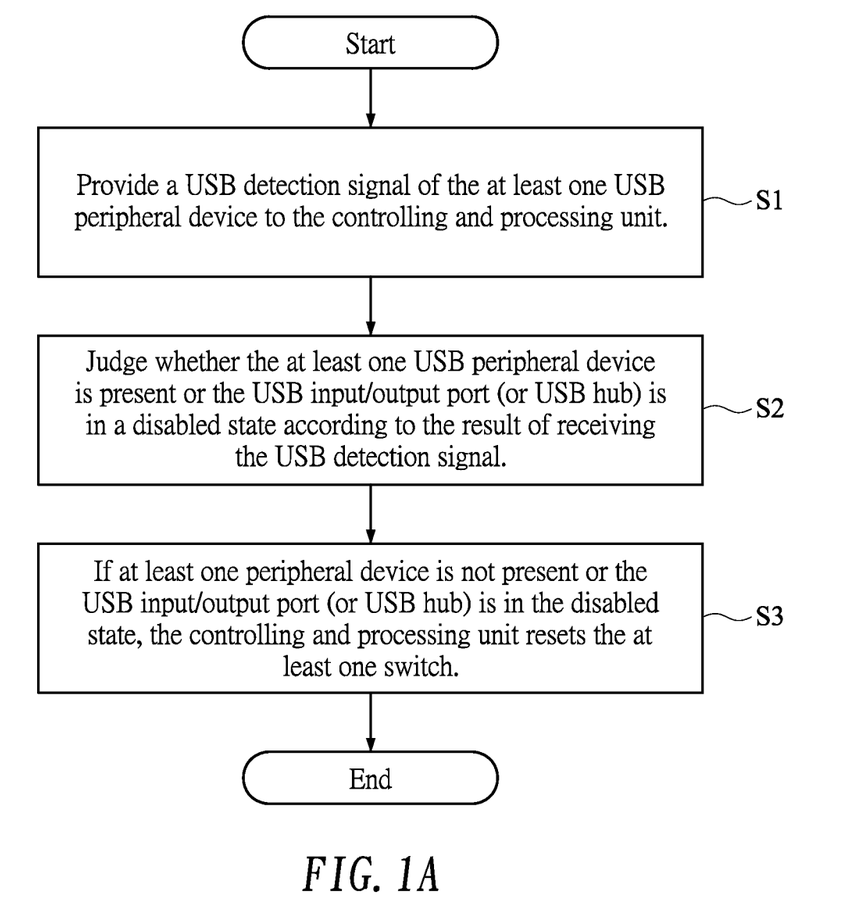
FIG. 1A is a flowchart illustrating a USB detecting method according to an embodiment of the present invention.
Figure 1B:
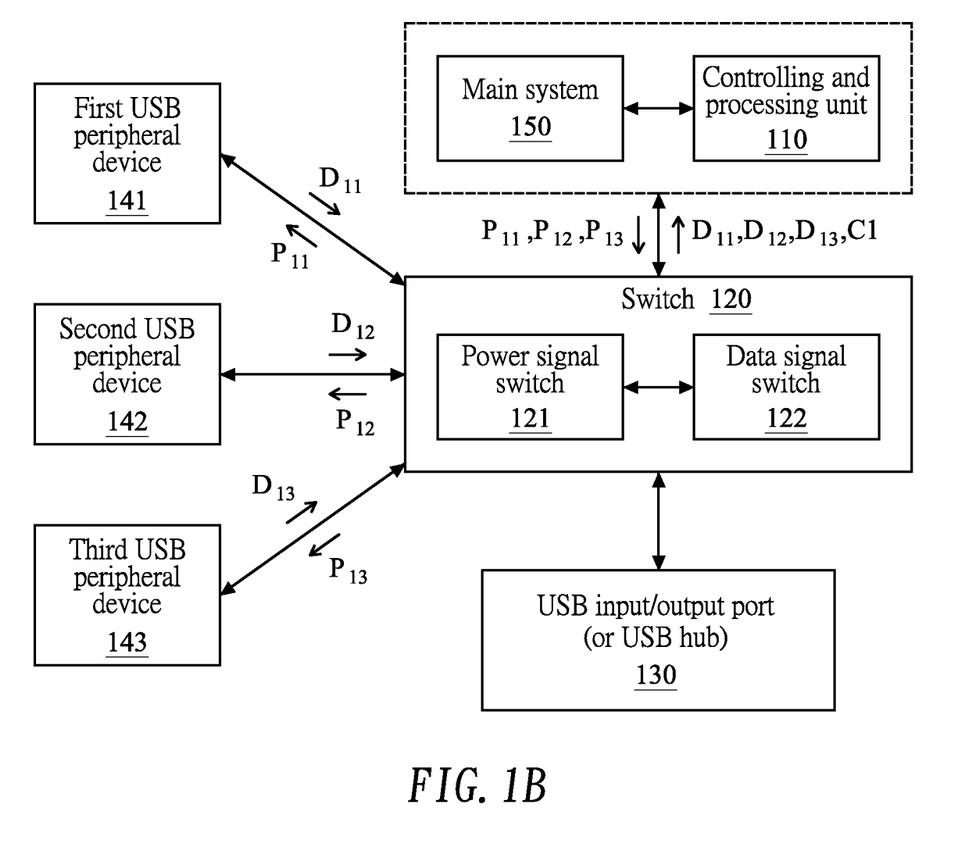
FIG. 1B is a schematic functional block diagram illustrating a first exemplary detecting system using the USB detecting method of FIG. 1A.
Figure 1C:
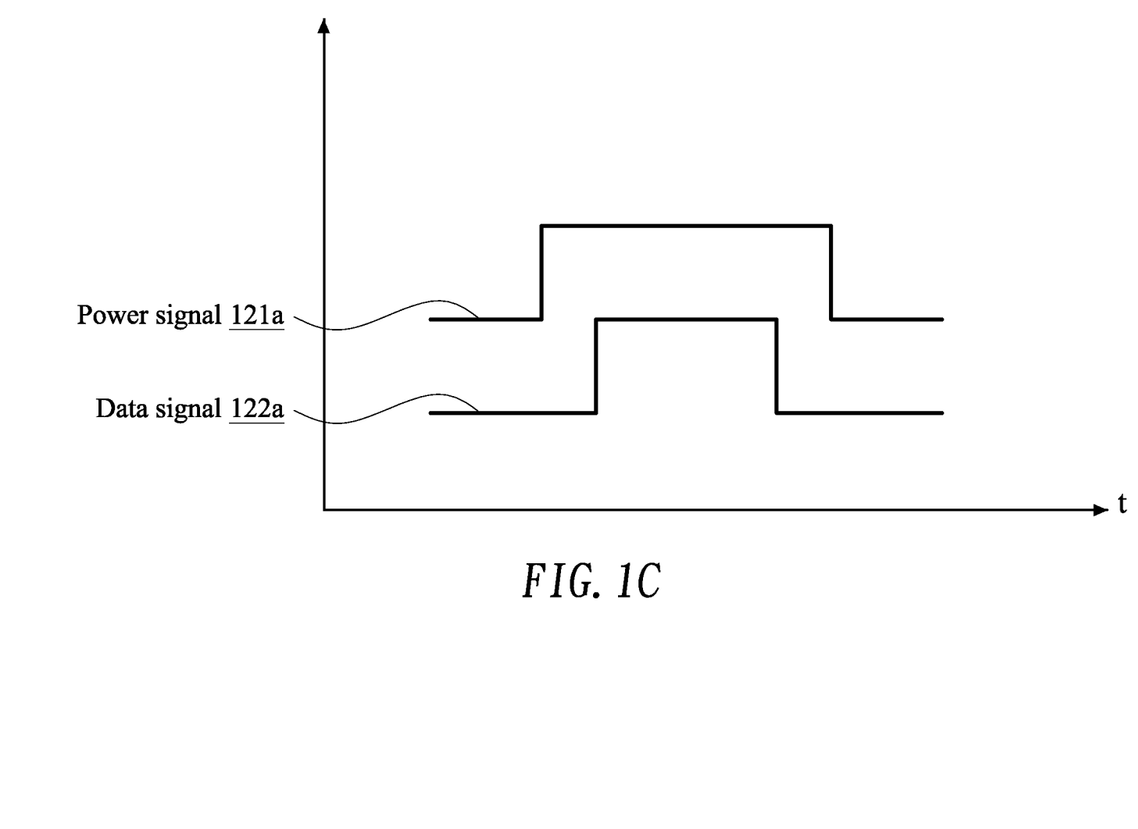
FIG. 1C is a schematic timing waveform diagram illustrating the electric signal and the data signal processed by the USB detecting method of the present invention.

FIG. 1A is a flowchart illustrating a USB detecting method according to an embodiment of the present invention. FIG. 1B is a schematic functional block diagram illustrating a first exemplary detecting system using the USB detecting method of FIG. 1A. FIG. 1C is a schematic timing waveform diagram illustrating the power signal and the data signal processed by the USB detecting method of the present invention.

Please refer to FIGS. 1A and 1B. In this embodiment, the USB detecting method is applied to a detecting system comprising a main system 150 and/or a controlling and processing unit 110. The main system 150 and the controlling and processing unit 110 are electrically connected with each other. The detecting system further comprises a USB input/output port (or USB hub) 130, at least one switch 120 and plural USB peripheral devices 141~443.

In an embodiment, the at least one switch 120 is arranged between the USB peripheral devices 141~443 and the USB input/output port (or USB hub) 130. In another embodiment, the at least one switch 120 is arranged between the main system 150 (and/or the controlling and processing unit 110) and the USB input/output port (or USB hub) 130. In another embodiment, the at least one switch 120 is arranged between the main system 150 (and/or the controlling and processing unit 110), the USB input/output port (or USB hub) 130 and the USB peripheral devices 141~443. The USB input/output port (or USB hub) 130 and the USB peripheral devices 141~443 can be reset through the at least one switch 120. That is, the USB input/output port (or USB hub) 130 and the USB peripheral devices 141~143 are selectively enabled or disabled through the at least one switch 120.

The USB detecting method of the present invention will be described as follows. Firstly, in a step S1, the USB peripheral devices 141~143 provides corresponding USB detection signals D11~D13 to at least one of the main system 150 and the controlling and processing unit 110. According to the USB detection signals D11~D13, corresponding power signals P11~P13 are transmitted from the at least one of the main system 150 and the controlling and processing unit 110 to the corresponding USB peripheral devices 141~443. The USB detection signals D11~D13 are data signals. In an embodiment, the at least one of the main system 150 and the controlling and processing unit 110 actively performs a polling process to acquire the data signals D11~D13. In an embodiment, the at least one of the main system 150 and the controlling and processing unit 110 performs a daisy chain detecting process to acquire the data signals D11~D13.

Then, in a step S2, the at least one of the main system 150 and the controlling and processing unit 110 judges whether the USB peripheral devices 141~443 are present or the USB input/output port (or USB hub) 130 is in a disabled state according to the results of receiving the USB detection signals D11~D13. The results of receiving the USB detection signals D11~D13 indicate whether the USB peripheral devices 141~143 are present or the USB input/output port (or USB hub) 130 is in a disabled state. Moreover, according to the results of receiving the USB detection signals D11~D13, the at least one of the main system 150 and the controlling and processing unit 110 recognizes whether the number of the USB peripheral devices 141~143 connected to the USB input/output port (or USB hub) 130 is increased or decreased. In addition, the updated results of receiving the USB detection signals D11~D13 are transmitted to the at least one of the main system 150 and the controlling and processing unit 110.

In case that the circuitry of the USB input/output port (or USB hub) 130 to be electrically connected with the at least one of the main system 150 and the controlling and processing unit 110 is shut off or interrupted, the USB input/output port (or USB hub) 130 is in the disabled state. In the disabled state, the USB detection signals D11~D13 of the USB peripheral devices 141~143 connected to the USB input/output port (or USB hub) 130 cannot be transmitted from the USB input/output port (or USB hub) 130 to the at least one of the main system 150 and the controlling and processing unit 110.

If at least one of the USB peripheral devices 141~143 is not present or the USB input/output port (or USB hub) 130 is in the disabled state, a step S3 is performed. In the step S3, the at least one of the main system 150 and the controlling and processing unit 110 issues a control signal C1. In response to the control signal C1, the at least one switch 120 that is electrically connected with the USB peripheral devices 141~143 is reset.

In an embodiment, the USB input/output port (or USB hub) 130 issues the USB detection signals D11~D13 to the at least one of the main system 150 and the controlling and processing unit 110 at a specified time interval (e.g., 0.01 second, 0.05 second, 0.1 second, 0.5 second, 1 second or 2 seconds. If the at least one of the main system 150 and the controlling and processing unit 110 does not receive the USB detection signals D11~D13 within the specified time interval, the at least one of the main system 150 and the controlling and processing unit 110 judges that at least one of the USB peripheral devices 141~143 is not present or the USB input/output port (or USB hub) 130 is in the disabled state. Consequently, the at least one of the main system 150 and the controlling and processing unit 110 issues a control signal C1. The at least one switch 120 is reset in response to the control signal C1.

In another embodiment, if the number of times the USB detection signals D11~D13 are not transmitted to the at least one of the main system 150 and the controlling and processing unit 110 at the specified time interval reaches a specific number (e.g., 1, 2, 3 or 5), the at least one of the main system 150 and the controlling and processing unit 110 issues the control signal C1. As mentioned above, the at least one of the main system 150 and the controlling and processing unit 110 issues the control signal C1 according to the results of receiving the USB detection signals D11~D13. It is noted that the specified time interval, the specified number or any other appropriate factor may be varied according to the practical requirements.

For example, if the USB detection signal D11 has not been received within 1 second or the number of times the USB detection signals D11~D13 are not received is 3, the at least one of the main system 150 and the controlling and processing unit 110 judges that the USB peripheral device 141 is not present. Consequently, the at least one of the main system 150 and the controlling and processing unit 110 issues the control signal C1 to reset the at least one switch 120. Moreover, the at least one of the main system 150 and the controlling and processing unit 110 simulates the action of plugging and pulling out the USB peripheral device 141. That is, in response to the reset action of the at least one switch, the at least one of the main system 150 and the controlling and processing unit 110 re-detects the results of receiving the USB detection signals D11~D13. Consequently, the USB peripheral device 141 is read again.

Please refer to FIGS. 1B and 1C again. In this embodiment, the at least one switch 120 comprises a power signal switch 121 and a data signal switch 122. The power signal switch 121 is selectively turned on or turned off to conduct or interrupt a power signal 121a. The data signal switch 122 is selectively turned on or turned off to conduct or interrupt a data signal 122a. When the at least one of the main system 150 and the controlling and processing unit 110 resets the at least one switch 120, at least one of the power signal switch 121 and the data signal switch 122 is turned on or turned off. In other word, at least one of the power signal 121a and the data signal 122a is read again, so that the USB peripheral devices 141~443 are read again.

For example, a process of simultaneously resetting the power signal switch 121 and the data signal switch 122 to re-conduct the power signal 121a and the data signal 122a includes the following steps. Firstly, the at least one of the main system 150 and the controlling and processing unit 110 turns off the power signal switch 121 to interrupt the power signal 121a and turns off the data signal switch 122 to interrupt the data signal 122a. Then, the at least one of the main system 150 and the controlling and processing unit 110 turns on the data signal switch 122 to conduct the data signal 122a and turns on the power signal switch 121 to conduct the power signal 121a. Consequently, the action of the user to plug and pull out the USB peripheral devices 141~443 can be simulated. The at least one of the main system 150 and the controlling and processing unit 110 re-detects the results of receiving the USB detection signals D11~D13 (i.e., the data signals D11~D13).

It is noted that numerous modifications and alterations of the types, specifications and applications of the above components may be made while retaining the teachings of the invention. For example, the controlling and processing unit 110 is one of a single chip and a microcontroller. In accordance with a method of resetting the at least one switch 120, a control pin (e.g., a GPIO chip) of one of the single chip and a microcontroller is triggered. For example, the switch 120 is a transistor switching circuit. After the switch 120 is turned off in response to the control signal C1 from the controlling and processing unit 110, the switch 120 is turned on again. The above examples are presented herein for purpose of illustration and description only. It is noted that the examples may be varied according to the product applications and the practical requirements.

Figure 2:
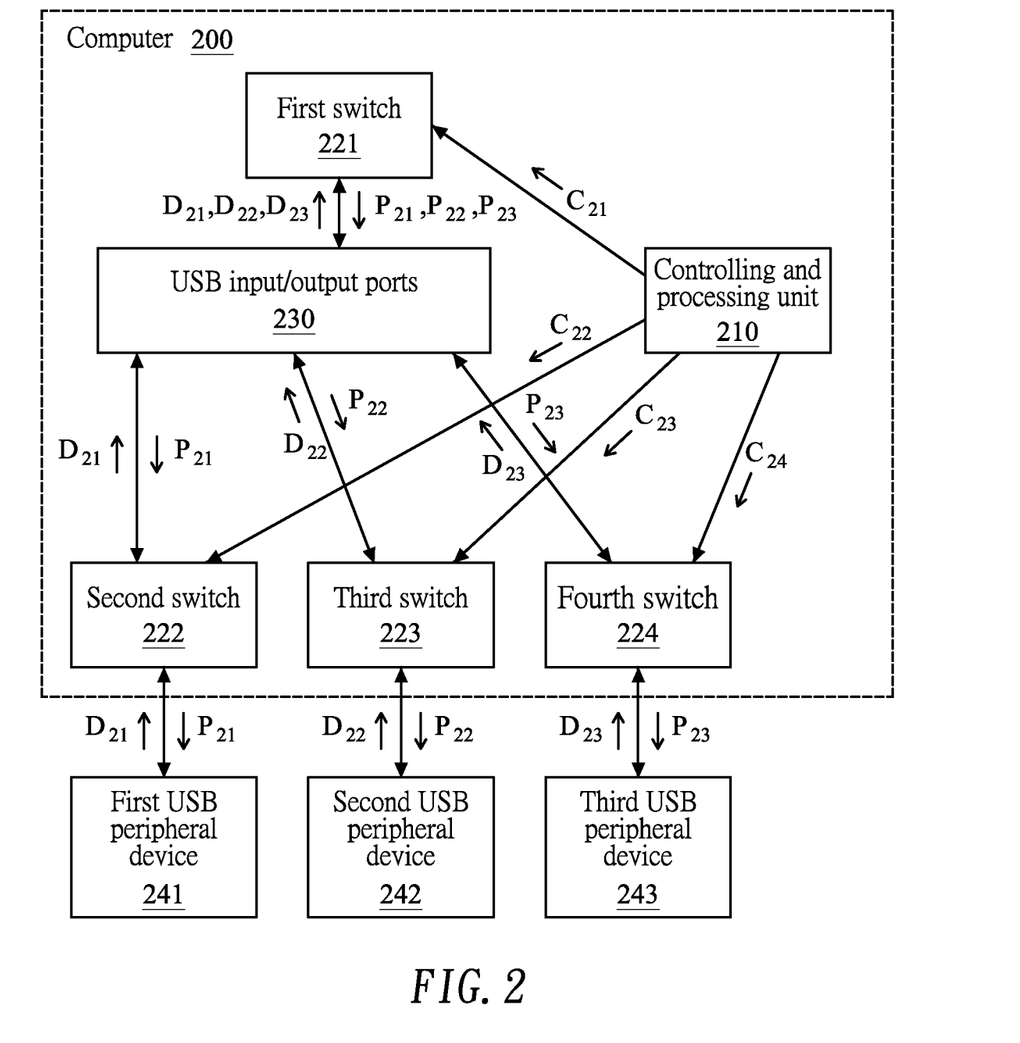
FIG. 2 is a schematic functional block diagram illustrating a second exemplary detecting system using the USB detecting method of FIG. 1A.

FIG. 2 is a schematic functional block diagram illustrating a second exemplary detecting system using the USB detecting method of FIG. 1A. Please refer to FIGS. 1A and 2. In this embodiment, the USB detecting method is applied to an electronic device. For example, the electronic device is a desktop computer, a notebook computer, a mobile smart device or a tablet computer. A computer 200 for a point-of-sale information management system is taken as an example of the electronic device.

The computer 200 at least comprises a controlling and processing unit 210, a USB input/output port 230 and plural switches 221~224, which are electrically connected with each other. The controlling and processing unit 210 can control these switches 221~224. The USB input/output port 230 is the input/output port on a back panel of the computer 200 so as to be electrically connected with plural USB peripheral devices 241~243. The first switch 221 is arranged between the controlling and processing unit 210 and the USB input/output port 230. The second switch 222, the third switch 223 and the switch 224 are arranged between the USB input/output port 230 and the plural USB peripheral devices 241~243. The first switch 221 is a main switch for the computer 200 and the plural USB peripheral devices 241~243. The switches 222, 223 and 224 are respective switches for the corresponding USB peripheral devices 241~243.

The USB detecting method of the present invention will be described as follows. Firstly, in the step S1, the USB peripheral devices 241~243 provides corresponding USB detection signals D21~D23 (i.e., data signals D21~D23) to the controlling and processing unit 210. According to the USB detection signals D21~D23, corresponding power signals P21~P23 are transmitted from the controlling and processing unit 210 to the corresponding USB peripheral devices 241~243.

Then, in the step S2, the controlling and processing unit 210 judges whether the USB peripheral devices 241~243 electrically connected with the computer 200 are present or the USB input/output port 230 is in a disabled state according to the results of receiving the USB detection signals D21~D23.

Moreover, according to the results of receiving the USB detection signals D21~D23, the controlling and processing unit 210 recognizes whether the number of the USB peripheral devices 241~243 connected to the USB input/output port 230 is increased or decreased.

If at least one of the USB peripheral devices 241~243 is not present or the USB input/output port 230 is in the disabled state, the step S3 is performed. In the step S3, the controlling and processing unit 210 issues control signals C21~C24. In response to the control signals C21~C24, the switches 221~224 are reset.

Figure 3:
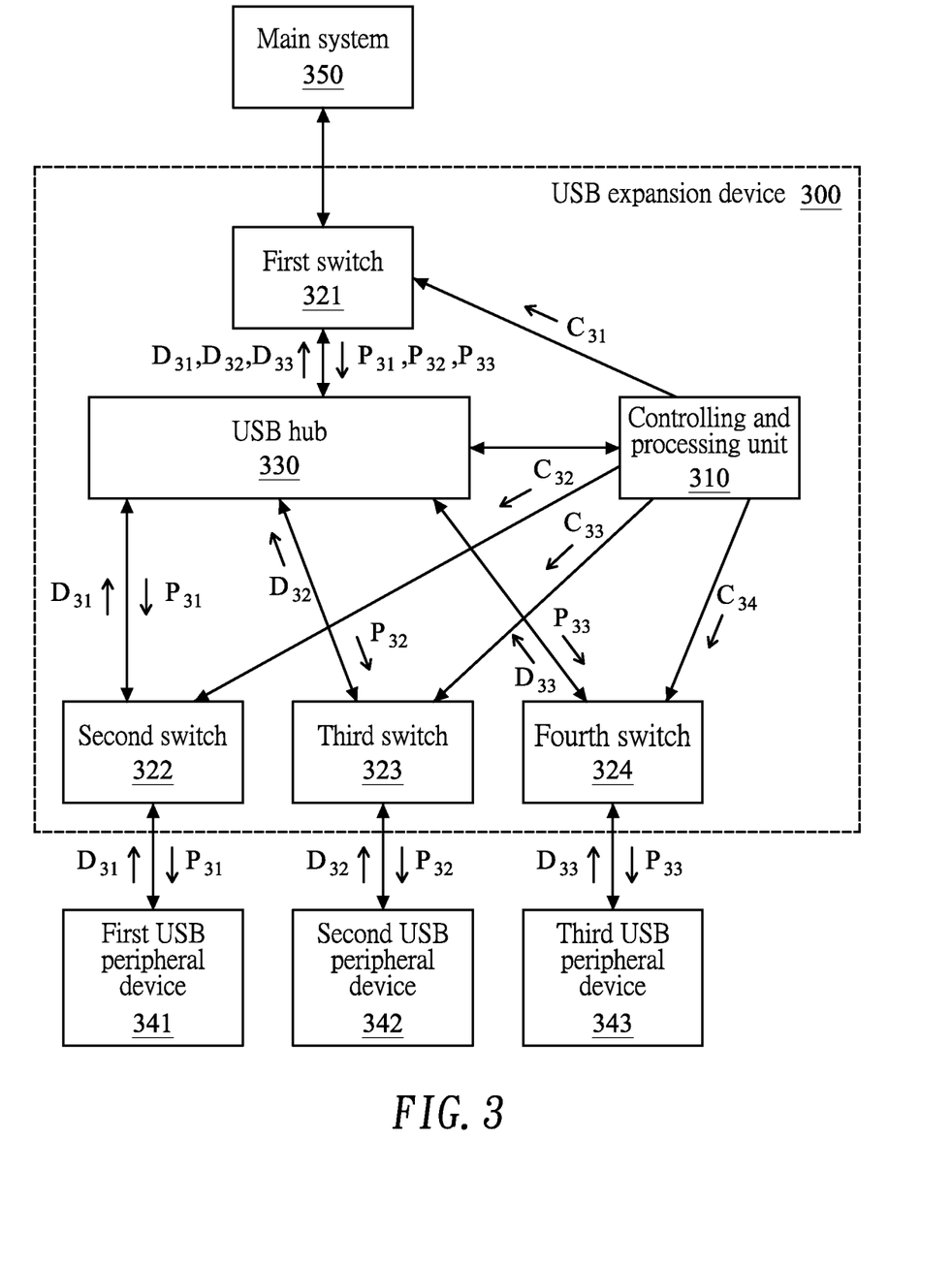
FIG. 3 is a schematic functional block diagram illustrating a third exemplary detecting system using the USB detecting method of FIG. 1A.

In the above embodiment, the USB detecting method is applied to the computer 200. It is noted that the applications of the USB detecting method are not restricted. FIG. 3 is a schematic functional block diagram illustrating a third exemplary detecting system using the USB detecting method of FIG. 1A. In this embodiment, the USB detecting method is applied to an external universal serial bus expansion device (also referred as a USB expansion device) 300.

Please refer to FIGS. 1A and 3. The USB expansion device 300 is electrically connected with a main system 350. An example of the main system 350 includes but is not limited to an electronic device, an in-vehicle computer, an industrial computer or any other appropriate professional computer. The USB expansion device 300 comprises a controlling and processing unit 310, a USB hub 330 and plural switches 321~324, which are electrically connected with each other. The controlling and processing unit 310 can control the USB hub 330 and the switches 321~324. The USB hub 330 is electrically connected with plural USB peripheral devices 341~343. The function of the USB hub 330 is similar to the function of the USB input/output port 230 in the above embodiment.

The first switch 321 is arranged between the main system 350 and the USB hub 330. The second switch 322, the third switch 323 and the switch 324 are arranged between the USB hub 330 and the plural USB peripheral devices 341~343. The first switch 321 is a main switch between the USB expansion device 300 and the main system 350. The switches 322, 323 and 324 are respective switches for the corresponding USB peripheral devices 341~343.

The USB detecting method of the present invention will be described as follows. Firstly, in the step S1, the controlling and processing unit 310 or the USB hub 330 actively performs a polling process to acquire USB detection signals D31~D33 (i.e., data signals D31~D33) from the USB peripheral devices 341~343 and provide the USB detection signals D31~D33 to the main system 350. That is, the data signals D31~D33 is directly provided to the main system 350 through the first switch 321 or indirectly provided to the main system 350 through the controlling and processing unit 310.

Then, in the step S2, the controlling and processing unit 310 judges whether the USB peripheral devices 341~343 are present according to the results of receiving the data signals D31~D33. Moreover, according to the results of receiving the data signals D31~D33, the controlling and processing unit 310 recognizes whether the number of the USB peripheral devices 341~343 0 is increased or decreased. Moreover, the results of receiving the data signals D31~D33 are updated.

If at least one of the USB peripheral devices 341~343 is not present, the step S3 is performed. In the step S3, the controlling and processing unit 310 issues control signals C31~C34. In response to the control signals C31~C34, the switches 321~324 are reset. After the main switch 321 is reset or the switches 322~324 are reset, the controlling and processing unit 310 actively performs a polling process to acquire the data signals D31~D33. Consequently, the USB peripheral devices 341~343 are read again.

From the above descriptions, the present invention provides the USB detecting method. The USB detection signals of the USB peripheral devices are provided to the main system through the controlling and processing unit or the USB hub. The plural switches are arranged between the main system and the controlling and processing unit, or arranged between the main system and the USB hub, or arranged between the USB hub and the connected USB peripheral devices. Consequently, the main system or the controlling and processing unit simulates the action of plugging and pulling out the USB peripheral devices and resets the switches. In response to the reset action, the USB detection signals of the USB peripheral devices are provided to the main system again. In such way, the automatic detecting function and the active correcting function are achieved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A USB expansion device for connecting at least a first USB peripheral device and a second USB peripheral device to a main system, comprising:
    a controlling and processing unit;
    a USB hub;
    a first switch, electrically and individually connected to the controlling and processing unit, the USB hub, and the first USB peripheral device; and
    a second switch, electrically and individually connected to the controlling and processing unit, the USB hub, and the second USB peripheral device;
    wherein the controlling and processing unit instructs the USB hub to provide a first corresponding power to the first USB peripheral device via the first switch according to a first USB detection signal if the controlling and processing unit receives the first USB detection signal of the first USB peripheral device via the first switch; and wherein the controlling and processing unit resets the first switch if the controlling and processing unit determines the USB hub is in a disabled state or the first USB detection signal of the first USB peripheral device is not received via the first switch.

2. The USB expansion device according to claim 1, wherein the main system performs a polling process or a daisy chain detecting process to acquire the first USB detection signal and a second USB detection signal.

3. The USB expansion device according to claim 1, wherein the controlling and processing unit is electrically connected with the main system, and performs a polling process or a daisy chain detecting process to acquire and provide the first USB detection signal and the second USB detection signal to the main system.

4. A computer system, comprising: a controlling and processing unit;
   a controlling and processing unit;
   a USB hub;
   a first switch, electrically and individually connected to the controlling and processing unit, the USB hub, and a first USB peripheral device; and
   a second switch, electrically and individually connected to the controlling and processing unit, the USB hub, and a second USB peripheral device;
   wherein the controlling and processing unit instructs the USB hub to provide a first corresponding power to the first USB peripheral device via the first switch according to a first USB detection signal if the controlling and processing unit receives the first USB detection signal of the first USB peripheral device via the first switch; and wherein the controlling and processing unit resets the first switch if the controlling and processing unit determines the USB hub is in a disabled state or the first USB detection signal of the first USB peripheral device is not received via the first switch.

5. The computer system according to claim 4, wherein the controlling and processing unit performs a polling process or a daisy chain detecting process to acquire the first USB detection signal and a second USB detection signal.

6. The computer system according to claim 4, wherein the USB hub enters the disabled state when the USB hub is shut off or interrupted.

7. The computer system according to claim 4, wherein the first switch further comprises a power signal switch and a data signal switch.

8. The computer system according to claim 7, wherein resetting the first switch includes sequentially disabling the power signal switch, disabling the data signal switch, enabling the data signal switch, and enabling the power signal switch of the first switch.

9. The computer system according to claim 4, further comprising a main switch electrically connected to the controlling and processing unit and the USB hub, wherein the controlling and processing unit instructs the USB hub via the main switch to provide the first corresponding power to the first USB peripheral device via the first switch according to the first USB detection signal if the controlling and processing unit receives the first USB detection signal of the first USB peripheral device via the first switch.

10. The USB expansion device according to claim 1, wherein the USB hub enters the disabled state when the USB hub is shut off or interrupted.

11. The USB expansion device according to claim 1, wherein the first switch further comprises a power signal switch and a data signal switch.

12. The USB expansion device according to claim 11, wherein resetting the first switch includes sequentially disabling the power signal switch, disabling the data signal switch, enabling the data signal switch, and enabling the power signal switch of the first switch.

13. The USB expansion device according to claim 1, further comprising a main switch electrically connected to the controlling and processing unit, the USB hub, and the main system, wherein the controlling and processing unit instructs the USB hub via the main switch to provide the first corresponding power to the first USB peripheral device via the first switch according to the first USB detection signal if the controlling and processing unit receives the first USB detection signal of the first USB peripheral device via the first switch.

14. A USB expansion device for connecting at least a first USB peripheral device and a second USB peripheral device to a main system, comprising:
   a controlling and processing unit;
   a USB hub;
   a first switch, electrically and individually connected to the controlling and processing unit, the USB hub, and the first USB peripheral device;
   a second switch, electrically and individually connected to the controlling and processing unit, the USB hub, and the second USB peripheral device; and
   a main switch electrically connected to the controlling and processing unit, the USB hub, and the main system,
   wherein the controlling and processing unit instructs the USB hub via the main switch to provide a first corresponding power to the first USB peripheral device via the first switch according to a first USB detection signal if the controlling and processing unit receives the first USB detection signal of the first USB peripheral device via the first switch; and
   wherein the controlling and processing unit resets the first switch if the controlling and processing unit determines the USB hub is in a disabled state or the first USB detection signal of the first USB peripheral device is not received via the first switch.

* * * * *